(12) United States Patent
Park et al.

(10) Patent No.: US 6,447,650 B1
(45) Date of Patent: Sep. 10, 2002

(54) MANUFACTURING METHOD OF CDS PHOTOCATALYST FOR HYDROGEN PRODUCTION AND METHOD FOR PRODUCING HYDROGEN BY USE OF THE SAME

(75) Inventors: Dae-Chul Park; Jin-Wook Baeg, both of Daejon (KR)

(73) Assignees: Korea Research Institute of Chemical Technology, Daejon (KR); Chonggu Co., Ltd., Taegu (KR)

( * ) Notice: Subject to any disclaimer, the term of this patent is extended or adjusted under 35 U.S.C. 154(b) by 0 days.

(21) Appl. No.: 09/762,293

(22) PCT Filed: May 1, 2000

(86) PCT No.: PCT/KR00/00411

§ 371 (c)(1),
(2), (4) Date: Mar. 30, 2001

(87) PCT Pub. No.: WO00/78450

PCT Pub. Date: Dec. 28, 2000

(30) Foreign Application Priority Data

Jun. 18, 1999 (KR) .............................. 99-22953

(51) Int. Cl.[7] .............................. C01B 3/00; C01G 9/00; C01G 1/00
(52) U.S. Cl. .................. 204/157.52; 423/102; 423/141; 423/142
(58) Field of Search .................. 423/22, 102, 141, 423/142; 204/157.52

(56) References Cited

FOREIGN PATENT DOCUMENTS

| JP | 57-144033 A | * | 9/1982 |
| JP | 62-277151 A | * | 12/1987 |
| JP | 09-225318 A | * | 9/1997 |
| JP | 10-310401 A | * | 11/1998 |
| KR | 2000-19205 A | * | 4/2000 |

OTHER PUBLICATIONS

* References N–R were cited in the International Search Report.*

* cited by examiner

Primary Examiner—Edna Wong
(74) Attorney, Agent, or Firm—Jacobson Holman, PLLC

(57) ABSTRACT

A method for preparing a CdS photocatalyst represented by general formula (I): m(a)/Cd[M(b)]S, comprising the steps of: dissolving Cd-containing and M-containing compounds in water in such an amount that the mol % of M ranges from 0.001 to. 20.00; adding one $H_2S$ or $Na_2S$ as a reactant in the solution with stirring to precipitate Cd[M]S; washing the precipitate with water and vacuum-drying the precipitate in a nitrogen environment at a temperature of 105~150° C. for 1.5~3.0 hours; doping a liquid m-containing compound to this precipitate in such an amount that the % by weight of m ranges from 0.10 to 5.00. In the formula, m represents a doped metal element as an electron acceptor selected from the group of Ni, Pd, Pt, Fe, Ru, Co or an oxidized compound of these metals; a represents a percentage by weight of m, ranging from 0.10 to 5.00; M is a promoter selected from the group consisting of V, Cr, Al, P, As, Sb and Pb; b represents mol % of M/(M+Cd), ranging from 0.001 to 20.00.

7 Claims, No Drawings

MANUFACTURING METHOD OF CDS PHOTOCATALYST FOR HYDROGEN PRODUCTION AND METHOD FOR PRODUCING HYDROGEN BY USE OF THE SAME

TECHNICAL FIELD

The present invention relates, in general, to a method for preparing a photocatalyst for hydrogen production and a method for producing hydrogen by use of the same, more particularly, to a method for preparing a CdS photocatalyst for the use of hydrogen production and to a photoreaction in which hydrogen is efficiently produced from water in the presence of the CdS photocatalyst.

BACKGROUND ART

In general, hydrogen is used to produce ammonia and methanol in the chemical industry. Hydrogen is also an essential material for hydrogenation in which unsaturated compounds are converted into saturated ones and for hydrotreating processes, including hydrogen addition, desulfurization, denitrogenation and demetallization. Another example for the use of hydrogen is contact hydrogenation of carbon dioxide which causes global warming. In addition, hydrogen is viewed as a pollution-free, clear energy source substituting for existing fossil fuels.

Conventional techniques for obtaining hydrogen include extraction from fossil fuels, such as naphtha, modification of natural gas, reaction of vapor with iron at a high temperature, reaction of water with alkaline metal, electrolysis of water, etc.

However, the said conventional methods are not economically favorable because immense heat or electric energy is required. Regarding modification of fossil fuels, the conventional methods have another disadvantage of generating a large quantity of by-products, such as carbon dioxide. In case of electrolysis, problems, such as a short electrode lifetime and generation of by-products, should be solved to purify hydrogen more easily. Thus the cost of facilities for hydrogen production is economically unfavorable due to the noted problems.

In the nature, some of hydrogen exists, in various compounds forms, particularly in inorganic forms but most of it exists in water. Only a small quantity of hydrogen exists in the atmosphere because it is of low specific gravity. It is also very difficult and economically unfavorable to purify hydrogen existing in inorganic forms.

Therefore, a method to produce hydrogen from water will be a very. meaningful technique in near future. Recently, hydrogen producing techniques have been developed in which photocatalysts are used to decompose water into hydrogen and oxygen. However, little has been published in prior art relating to photocatalysts for producing hydrogen. Representative examples are Japanese Pat. Laid-Open Publication Nos. Sho 62-191045 and Sho 63-107815 and a couple of Korean Patent applications by the present inventors as described as below.

Japanese Pat. Laid-Open Publication No. Sho 62-191045 relates to generating hydrogen from an aqueous $Na_2S$ solution in the presence of a rare earth element compound by a photolysis reaction. The rare earth element compound has an advantage of exhibiting optical activity in the range of visible light Japanese Pat. Laid-Open Publication No. Sho 63-107815 concerns a photolysis reaction in which a composite oxide of niobium and alkaline earth metal is used as a photocatalyst to generate hydrogen from a methanol solution in water. This photocatalyst likewise has an advantage of being active in the range of visible light.

However, both of the said prior arts are disadvantageous because the amount of hydrogen generated is as little as 10 ml/0.5 g hr.

Korean Pat. Application No. 95-7721 applied by the present inventors solve the above problems to some degree by suggesting a photocatalyst represented by the following formula I:

$$Cs(a)/K_{Nb6}O_7 \qquad \text{I}$$

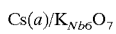

This technique has little affect on the environment and generates hydrogen at room temperature but the oxygen-containing organic compounds is needed as hydrogen-generating promoters.

Korean Pat. Application No. 95-30416 suggests a photocatalyst represented by the following formula II:

$$Cs(a)H(c)/S(b) \qquad \text{II}$$

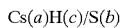

This technique has little affect on the environment and generates hydrogen without an oxygen-containing organic compounds as a hydrogen-generating promoter at room temperature, but encounters a problem with the life time and the stability of the photocatalyst. For example, when an alkali metal, such as cesium, is impregnated into a photocarrier, the amount of generated hydrogen is increased outstandingly but the stability of the catalyst is decreased.

Similarly, Korean Pat. Application No. 96-44214 suggests a photocatalyst represented by the following formula III:

$$Pt(A)/Zn[M(B)]S \qquad \text{III}$$

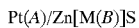

This technique also has little affect on the environment. This compound shows not only the optical activity of photocatalyst in some degree but also the preparation is relatively simple and the stability of photocatalyst is superior. The life time of said compound is longer which depends on electron donors and reducing agents and the amount of generated hydrogen is larger than that of prior arts. When doping with Pt instead of Cs, the stability of the catalyst is improved but still the amount of generated hydrogen is not enough in the economic point of view.

Korean Pat. Application No. 98-37179 suggests a photocatalyst represented by the following formula IV:

$$Pt(a)/Zn[M(b)]S \qquad \text{IV}$$

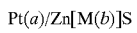

This technique also has little affect on the environment and the said photocatalyst has optical activity in some degree in the range of visible light. The preparation of the said photocatalyst is more simpler and by-products are much less produced.

To solve the above problem, Korean Pat. Application 98-37180 by present inventors suggests a photocatalyst represented by the following formula V:

$$m(A)/Cd[M(B)]S \qquad \text{V}$$

The said photocatalyst shows an optical activity in the range of visible light adjusted by light filter as well as sun light. The amount of generated hydrogen is much larger and the life time of the said photocatalyst is semi-infinitive. By introducing various doping metals and promoters and other new methods, the said application solves the restricted activity to the light source and suggests more simple preparation process. Likewise, the life time of photocatalyst is also longer and the amount of generated hydrogen from water is remarkably larger than that of prior art. However, this technique shows limited hydrogen activity only to one reducing agent.

DISCLOSURE OF THE INVENTION

Therefore, it is an object of the present invention to overcome the previously-noted problems encountered in prior art, and to provide economical reduction system which remarkably improves the restricted activity of photocatalysts of prior art.

It is an another object of the present invention to provide that the preparation of the photocatalyst in the present invention is more simple and has little affect on the environment.

It is an another object of the present invention to provide that the photocatalyst in the present invention has an optical activity in the range of visible light adjusted by light filter as well as sun light and thus the amount of generated hydrogen is much larger.

It is an further object of the present invention to provide the life time of the photocatalyst in the present invention being semi-infinitive.

BEST MODE FOR CARRYING OUT THE INVENTION

A photocatalyst in accordance with the present invention represented by the following formula VI:

$$m(A)/Cd[M(B)]S \qquad \qquad VI$$

wherein m represents a doped metal element as an electron acceptor selected from the group of Ni, Pd, Pt, Fe, Ru, Co or an oxidized compound of these metals; A represents a percentage by weight of m, ranging from 0.10 to 5.00; M is a promoter selected from the group consisting of V, Cr, Al, P, As, Sb and Pb; B represents mole% of M/(M+Cd), ranging from 0.001 to 20.00.

A method for preparing the said photocatalyst of formula VI, comprising the steps of: dissolving Cd-containing and M-containing compounds in water in such an amount that the mol % of M ranges from 0.001 to 20.00; adding $H_2S$ or $Na_2S$ as a reactant in the solution with stirring to precipitate Cd[M]S; washing the precipitate with water and vacuum-drying the precipitate in a nitrogen environment at a temperature of 105~150° C. for 1.5~3.0 hours; doping a liquid m-containing compound to this precipitate in such amount that the % by weight of m ranges from 0.10 to 5.00.

Likewise prior art of present inventors, hydrogen is produced by a method in which visible light adjusted by a light filter or sun light is irradiated onto a suspension of the said photocatalyst in water to which $Na_2S$ as a electron donor and $NaH_2PO_2$ or $Na_2SO_3$ as a reducing agent have been added.

In detail, the present invention will be described as below.

In the formula VI, m represents a doped metal element as an electron acceptor selected from the group of Ni, Pd, Pt, Fe, Ru, Co or an oxidized compound of these metals; A represents a percentage by weight of m, ranging from 0.10 to 5.00. Below 0.10 % by weight, the amount of generated hydrogen is decreased, and the stability of the photocatalyst is also reduced. On the other hand, over 5.00% by weight, the amount of generated hydrogen is decreased, and the cost of production of photocatalyst is also increased.

M is a promoter selected from the group consisting of V, Cr, Al, P, As, Sb and Pb; B represents mole% of M/(M+Cd), ranging from 0.001 to 20.00. In case of less than 0.001 mole % of M, the function of photocatalyst is lost, and in case of over 20.00 mole % of M, the amount of generated hydrogen is decreased.

The appropriate molar ratio of Cd/S is from 1:0.1 to 1:2.8, and more desirably from 1:0.6 to 1:1.4. Within said molar ratio, the effectiveness of the photocatalyst is improved.

In the preparation of the said photocatalyst, if m is platinum(Pt) as a doping element, it is preferable for Pt to be illuminated with UV in a nitrogen atmosphere and doped on the Cd[M]S by sintering. More preferably, hydrogen hexachloroplatinate(IV) ($H_2PtCl_6$) is added to the Cd[M]S precipitate and irradiated with UV light in a nitrogen atmosphere to impregnate the carrier at such an amount that the value of A for Pt(A) ranges from 0.10 to 5.00. The precipitate thus obtained is washed with water until the wash water pH reaches 7, vacuum-dried at 105 to 130° C. for 1.5 to 3.0 hours, oxidation-sintered at 300 to 400° C. for 1.0 to 5.0 hours and then reduction-sintered at 300 to 400° C. for 1.0 to 5.0 hours.

In case of other doping elements except Pt, the preferable preparation example of the photocatalyst comprises the steps of: adding an m-containig compound other than platinum to the Cd[M]S precipitate obtained to reach the value of m ranging from 0.10 to 5.00; adding slowly 6 or 7 drops of conc. hydrochloric acid with stirring; applying ultrasonication to the obtained slurry for 1.0 to 5.0 minutes; drying at 110 to 130° C. for 1.5 to 3.0 hours in vacuo; oxidation-sintering at 300 to 400° C. for 1.0 to 5.0 hours and then reduction-sintering at 300 to 400° C. for 1.0 to 5.0 hours.

In the preparation of photocatalyst doped with Pt, the reason why it is dried and sintered at oxidation/reduction state after the pH reaches 7 is to keep electron acceptor, Pt, in pure state. As well known, when Pt in $H_2PtCl_6$ is irradiated with UV, Pt activates the surface of CdS and makes a bond with separated S to form PtS and therefore a Wurzite structure is obtained by sintering under oxidation and reduction states at a temperature of 300 to 400° C. for 1.0 to 5.0 hours, Pt as an electron acceptor can be transferred to pure state of Pt(0). More preferably, it should be sintered at a temperature of from 320 to 390° C. and beyond this temperature range, the lifetime and optical activity of said photocatalyst is decreased.

Examples of the Cd-containing compounds include $CdCl_2$, $CdBr_2$, $CdI_2$, $Cd(CH_3CO_2)_2 \cdot xH_2O$, $CdSO_4 \cdot xH_2O$ and $Cd(NO_3)_2 \cdot 24H_2O$ and examples of the M-containing compounds include $K_2Cr_2O_7$, $Cr(NO_3)_3$, $Al(NO_3)_3$, $AlCl_3$, $H_3PO_2$, $NaH_2PO_2$, $As_2O_5$, $SbCl_3$, $MnCl_3$, $KMnO_4$, $Pb(NO_3)_2$, $Pb(CH_3CO_2)_4$, $RuCl_3$, $VCl_3$, $VOSO_4$, $VOCl_3$, etc. And examples of the m-containing compounds include $FeCl_3$, $H_2PtCl_6$, $RuCl_3$, $Co(NO_3)_2$, $CoCl_2$, $Co(CH_3CO_2)_2$, $NiSO_4$, $Ni(NO_3)_2$, $Ni(CH_3CO_2)_2$, $NiCl_2$, $NiBr_2$, $NiI_2$, $Pd(No_3)_2$, etc.

In Korean Pat. Application No. 96-44214 of present inventors, etching with acid is required after the primary sintering, but in the present invention, only the procedure of drying the precipitate in vacuo in a nitrogen atmosphere is needed, so procedures for the primary sintering and etching with acid can be canceled.

However, according to the present invention hydrogen is produced by dissolving from 0.15 to 1.00 mol of $Na_2S$ as an electron donor and from 0.15 to 1.00 mol of $H_2PO_2$ or $SO_3^{2-}$ as a reducing agent in primary and/or secondary distilled water or in the previously treated water, and adding the photocatalyst of the present invention thereto. Then, the thus-obtained suspension is irradiated with visible light adjusted by a light filter or sunlight with stirring at a temperature of from 5 to 85° C. under from 0.1 up to 5 atm. to produce hydrogen from water in a high degree of efficiency.

In addition, it is an important step to keep the concentration range of electron donor and reducing agent within the noted limits. If it is below the lower limit, the amount of hydrogen generated is decreased; if it is excess, the amount of hydrogen generated can not be increased further and the optimal reaction condition is at a temperature of from 10 to 60° C. in from a vacuum to 2 atm.

The photocatalyst of the present invention has an semi-infinitive lifetime if the electron donor and reducing agents are added repeatedly to the reaction. The reaction time of ZnS photocatalyst in prior art is only 6 to 8 hours, but, surprisingly, the reaction time of photocatalyst of the present invention is from 20 to 25 hours, which means that said photocatalyst has continuously kept its activity well.

PREPARATION EXAMPLE I to VII

Admix with 125 ml of waters $CdSO_4 H_2O$, $K_2Cr_2O_7$ as a promoter and $H_2S$ as a reactant in accordance with each of Table I until a precipitate appears. Stir the resulting admixture wherein the precipitate is CdCrS. Wash this precipitate with wash water until the pH of the wash water reaches 7. Vacuum-dry the thus-washed precipitate in a nitrogen atmosphere at a temperature of 130° C. for 2 hours to yield a CdCrS powder. Add $Ni(NO_3) 26H_2O$ to impart 1% by weight of Ni to the yielded CdCrS powder. Then slowly add 6 to 7 drops of conc. hydrochloric acid with stirring, followed by ultrasonication of the obtained product for 3 minutes, drying at a temperature of 130° C. for 2 hours, and finally oxidation sintering at a temperature of 360° C. for 4 hours and again reduction sintering at a temperature of 360° C. for 4 hours to yield a final Ni(1 wt. %)/Cd[Cr(0.2)]S photocatalyst.

PREPARATION EXAMPLE VIII

Repeat Preparation Example I, except: follow the oxidation sintering at a temperature of 360° C. for 2 hours and again reduction sintering at a temperature of 360° C. for 2 hours to yield a final Ni(1 wt. %)/Cd[Cr(0.2)]S photocatalyst.

PREPARATION EXAMPLE IX

Repeat Preparation Example I, except: follow the oxidation sintering at a temperature of 360° C. for 2.5 hours and again reduction sintering at a temperature of 360° C. for 2.5 hours to yield a final Ni(1 wt. %)/Cd[Cr(0.2)]S photocatalyst.

PREPARATION EXAMPLE X

Repeat Preparation Example I, except: follow the oxidation sintering at a temperature of 360° C. for 3 hours and again reduction sintering at a temperature of 360° C. for 3 hours to yield a final Ni(1 wt. %)/Cd[Cr(0.2)]S photocatalyst.

PREPARATION EXAMPLE XI

Repeat Preparation Example I, except: follow the oxidation sintering at a temperature of 360° C. for 3.5 hours and again reduction sintering at a temperature of 360° C. for 3.5 hours to yield a final Ni(1 wt. %)/Cd[Cr(0.2)]S photocatalyst.

PREPARATION EXAMPLE XII

Repeat Preparation Example I except substitute 0.05 mol % for 0.2 mol % of Cr to yield a final Ni(1 wt. %)/Cd[Cr(0.05)]S photocatalyst.

PREPARATION EXAMPLE XIII

Repeat Preparation Example I except substitute 0.1 mol % for 0.2 mol % of Cr to yield a final Ni(1 wt. %)/Cd[Cr(0.1)]S photocatalyst.

PREPARATION EXAMPLE XIV

Repeat Preparation Example I except substitute 0.5 mol % for 0.2 mol % of Cr to yield a final Ni(1 wt. %)/Cd[Cr(0.5)]S photocatalyst.

PREPARATION EXAMPLE XV

Repeat Preparation Example I except substitute 1.0 mol % for 0.2 mol % of Cr to yield a final Ni(1 wt. %)/Cd[Cr(1.0)]S photocatalyst.

PREPARATION EXAMPLE XVI

Repeat Preparation Example I except substitute $RuCl_3 3H_2O$ for the $Ni(NO_3)_2 6H_2O$ to impart 1.0 weight % of Ru to the precipitate and thus yield a final Ru(1 wt. %)/Cd[Cr(0.2)]S photocatalyst.

PREPARATION EXAMPLE XVII

Repeat Preparation Example XVI except cancel the procedure of the reduction sintering and thus yield a final $RuO_2$(1 wt. %)/Cd[Cr(0.2)]S photocatalyst.

PREPARATION EXAMPLE X IX

Repeat Preparation Example I except substitute $Co(NO_3)_2 6H_2O$ for the $Ni(NO_3)_2 6H_2O$ to impart 1.0 weight % of Co to yield a final Co(1 wt. %)/Cd[Cr(0.2)]S photocatalyst.

PREPARATION EXAMPLE XX

Repeat Preparation Example I except substitute $Pd(NO_3)_2$ for the $Ni(NO_3)_2 6H_2O$ to impart 1.0 weight % of Pd to yield a final Co(1 wt. %)/Cd[Cr(0.2)]S photocatalyst.

PREPARATION EXAMPLE XXI

Repeat Preparation Example I except substitute $H_2PtCl_6$ for the $Ni(NO_3)_2 6H_2O$ to impart 1.0 weight % of Pt to the precipitate and thus yield a final Pt(1 wt. %)/Cd[Cr(0.2)]S photocatalyst.

PREPARATION EXAMPLE XXII

Repeat Preparation Example I except substitute $H_2PtCl_6$ for the $Ni(NO_3)_2 6H_2O$ to impart 1.0 weight % of Pt to the precipitate and irradiate with UV light in a nitrogen environment for 0.5 hour and wash the precipitate with water until pH 7 reaches and dry at 130° C. for 2 hours and oxidation sintering at 360° C. for 4 hours, reduction sintering at 360° C. for 4 hours, and thus yield a final Pt(1 wt. %)/Cd[Cr(0.2)]S photocatalyst

PREPARATION EXAMPLE XXIII

Admix with 125 ml of water, $CdSO_4 H_2O$, 5 mol % of $H_3PO_2$ as a promoter and $H_2S$ as a reactant with stirring until a precipitate appears. Stir the resulting admixture wherein the precipitate is CdPS. Wash this precipitate with wash water until the pH of the wash water reaches 7. Vacuum-dry the thus-washed precipitate in a nitrogen atmosphere at a temperature of 130° C. for 2 hours to yield a CdPS powder. Repeat Preparation Example I except substitute $H_2PtCl_6$ for the $Ni(NO_3)_2 6H_2O$ to impart 1.0 weight % of Pt to the obtained CdPS powder and thus yield a final Pt(1 wt. %)/Cd[Cr(0.2)]S photocatalyst.

PREPARATION EXAMPLE XXIV

Repeat Preparation XX II, except substitute $H_3PO_2$ for $K_2Cr_2O_7$ as a promoter, to yield a final Pt(1 wt. %)/Cd[Cr(0.2)]S photocatalyst.

PREPARATION EXAMPLE XXV

Repeat Preparation Example XX III except substitute $Ni(NO_3)_2$ $6H_2O$ for $H_2PtCl_6$ to impart 1.0 weight % of Ni, to yield a final Ni(1 wt. %)/Cd[P(5.0)]S photocatalyst.

PREPARATION EXAMPLE XXVI

Repeat Preparation L, except substitute Al(NO3)3 for $K_2Cr_2O_7$ as a promoter, to yield a final Ni(1 wt. %)/Cd[Al(0.5)]S photocatalyst.

PREPARATION EXAMPLE XXVII

Repeat Preparation I, except substitute $As_2O_5$ $2H_2O$ for $K_2Cr_2O_7$ as a promoter, to yield a final Ni(1 wt. %)/Cd[As(0.5)]S photocatalyst.

PREPARATION EXAMPLE XXVIII

Repeat Preparation XXVII, except impart 2.0 mol % of As as a promoter instead of 0.5 mol % of As, to yield a final Ni(1 wt. %)/Cd[As(2.0)]S photocatalyst.

PREPARATION EXAMPLE XXIX

Repeat Preparation I, except substitute $MnCl_3$ for $K_2Cr_2O_7$ as a promoter, to yield a final Ni(1wt. %)/Cd[Mn(0.2)]S photocatalyst.

PREPARATION EXAMPLE XXX

Repeat Preparation XXIX, except impart 0.5 mol % of Mn instead of 0.2 mol % of Mn as a promoter, to yield a final Ni(1 wt. %)/Cd[As(2.0)]S photocatalyst.

PREPARATION EXAMPLE XXXI

Repeat Preparation I, except substitute $SbCl_3$ for $K_2Cr_2O_7$ as a promoter, to yield a final Ni(1 wt. %)/Cd[Sb(0.5)]S photocatalyst.

PREPARATION EXAMPLE XXXII

Repeat Preparation XXXI, except impart 2.0 mol % of Sb instead of 0.2 mol % of Sb as a promoter, to yield a final Ni(1 wt. %)/Cd[Sb(2.0)]S photocatalyst

PREPARATION EXAMPLE XXXIII

Repeat Preparation I, except impart 2.0 mol % of Sb as a promoter, to yield a final Ni(1 wt. %)/Cd[Pb(0.01)]S photocatalyst

PREPARATION EXAMPLE XXXIV

Repeat Preparation I, except impart 2.0 mol % of Sb as a promoter, to yield a final Ni(1 wt. %)/Cd[Pb(0.1)]S photocatalyst.

PREPARATION EXAMPLE XXXV

Repeat Preparation I, except impart 2.0 mol % of Sb as a promoter, to yield a final Ni(1 wt. %)/Cd[Pb(0.5)]S photocatalyst.

PREPARATION EXAMPLE XXXVI

Repeat Preparation I, except substitute $VCl_3$ for $K_2Cr_2O_7$ as a promoter, to yield a final Ni(1 wt. %)/Cd[V(0.5)]S photocatalyst.

COMPARATIVE PREPARATION EXAMPLE I

Repeat Preparation I, except impart 3 % by weight of Ni, to yield a final Ni(3 wt. %)/Cd[Cr(0.2)]S photocatalyst.

COMPARATIVE PREPARATION EXAMPLE II

Repeat Preparation I, except impart 3 % by weight of Fe, to yield a final Fe(3 wt. %)/Cd[Cr(0.2)]S photocatalyst.

EXAMPLE I

Suspend 0.5 g of the photocatalyst, obtained in accordance with Preparation Example I, in 500 ml of water which contains 0.24 mol/l of $Na_2S$ and 0.36 mol/l $Na_2SO_3$ and stir the resulting suspension at a speed of 300 rpm in a photo reactor of a closed gas circulation system. Illuminate the resulting suspension with visible light (500 W Xe lamp with an optical filter which passes light with a wavelength over 400nm, with sample 4cm from light source) at room temperature and at 1 atm. On analysis by gas chromatography and Burette the amounts of produced hydrogen thus obtained are reflected in Table I below.

EXAMPLE II

Repeat Example I with 0.5 g of the photocatalyst obtained in accordance Preparation Example II except impart the molar ratio of $Na_2S$: $Na_2SO_3$ to be 0.24 mol: 0.36 mol/l in 500 ml water. On analysis by gas chromatography and Burette the amounts of produced hydrogen thus obtained are reflected in Table I below.

EXAMPLE III

Repeat Example I with 0.5 g of the photocatalyst obtained in accordance Preparation Example III except impart the molar ratio of $Na_2S$: $Na_2SO_3$ to be 0.48 mol/l: 0.36 mol/l in 500 ml water. On analysis by gas chromatography and Burette the amounts of produced hydrogen thus obtained are reflected in Table I below.

EXAMPLE IV

Repeat Example I with 0.5 g of the photocatalyst obtained in accordance Preparation Example IV except impart the molar ratio of $Na_2S$ $Na_2SO_3$ to be 0.36 mol/l 0.24 mol/l in 500 ml water. On analysis by gas chromatography and Burette the amounts of produced hydrogen thus obtained are reflected in Table I below.

EXAMPLE V

Repeat Example I with 0.5 g of the photocatalyst obtained in accordance Preparation Example V except impart the molar ratio of $Na_2S$: $Na_2SO_3$ to be 0.36 mol/l: 0.48 mol/l in 500 ml water. On analysis by gas chromatography and Burette the amounts of produced hydrogen thus obtained are reflected in Table I below.

EXAMPLE VI

Repeat Example I with 0.5 g of the photocatalyst obtained in accordance Preparation Example VI except impart the molar ratio of $Na_2S$: $Na_2SO_3$ to be 0.24 mol/l: 0.24 mol/l in 500 ml water. On analysis by gas chromatography and Burette the amounts of produced hydrogen thus obtained are reflected in Table I below.

EXAMPLE VII

Repeat Example I with 0.5 g of the photocatalyst obtained in accordance Preparation Example VII except impart the molar ratio of $Na_2S$: $Na_2SO_3$ to be 0.48 mol/l: 0.48 mol/l in 500 ml water. On analysis by gas chromatography and Burette the amounts of produced hydrogen thus obtained are reflected in Table I below.

EXAMPLE VIII TO XXXVI & COMPARATIVE EXAMPLE I TO II

Repeat Example I with 0.5 g of the photocatalyst obtained in accordance Preparation Example VIII to XXXVI & Comparative Preparation Example I to II, respectively, except impart the molar ratio of $Na_2S$: $Na_2SO_3$ to be 0.36 mol/l: 0.36 mol/l in 500 ml water. On analysis by gas chromatography and Burette the amounts of produced hydrogen thus obtained are reflected in Table I below.

EXAMPLE XXXVII

This procedure measures the lifetime of photocatalyst obtained in accordance with Preparation Example XVII. Suspend 0.5 g of photocatalyst obtained in accordance with Preparation Example XVII in 500 ml of water which contains 0.36 mol/l of $Na_2S$ and 0.36 mol/l of $Na_2SO_3$ and thereafter add a further 0.36 mol/l of $Na_2S$ and 0.36 mol/l of $Na_2SO_3$ into the above solution each subsequent period of 20 hours for total 100 hours, and measure the amount of produced hydrogen. As a result, the average value of the amount of produced gas during this procedure is 260 ml/hr, which is similar to the result (262ml/hr) of Example II. Thus, the results of this procedure establishes that the lifetime of the photocatalyst is almost infinite.

TABLE I

| Exam No. | Photocatalyst | Amount of gas (ml/hr) | Note |
|---|---|---|---|
| Preparation Example I | Ni(1 wt. %)/Cd[Cr(0.2)]S | 224 | $Na_2S:Na_2SO_3$ = 0.24 M:0.36 M |
| Preparation Example II | Ni(1 wt. %)/Cd[Cr(0.2)]S | 262 | $Na_2S:Na_2SO_3$ = 0.36 M:0.36 M |
| Preparation Example III | Ni(1 wt. %)/Cd[Cr(0.2)]S | 233 | $Na_2S:Na_2SO_3$ = 0.48 M:0.3 M |
| Preparation Example IV | Ni(1 wt. %)/Cd[Cr(0.2)]S | 226 | $Na_2S:Na_2SO_3$ = 0.36 M:0.24 M |
| Preparation Example V | Ni(1 wt. %)/Cd[Cr(0.2)]S | 185 | $Na_2S:Na_2SO_3$ = 0.36 M:0.48 M |
| Preparation Example VI | Ni(1 wt. %)/Cd[Cr(0.2)]S | 176 | $Na_2S:Na_2SO_3$ = 0.24 M:0.24 M |
| Preparation Example VII | Ni(1 wt. %)/Cd[Cr(0.2)]S | 220 | $Na_2S:Na_2SO_3$ = 0.48 M:0.48 M |
| Preparation Example VIII | Ni(1 wt. %)/Cd[Cr(0.2)]S | 170 | oxidation and reduction sintering for 2 hours respectively |
| Preparation Example IX | Ni(1 wt. %)/Cd[Cr(0.2)]S | 163 | oxidation and reduction sintering for 2.5 hours respectively |
| Preparation Example X | Ni(1 wt. %)/Cd[Cr(0.2)]S | 169 | oxidation and reduction sintering for 3 hours respectively |
| Preparation Example XI | Ni(1 wt. %)/Cd[Cr(0.2)]S | 172 | oxidation and reduction sintering for 3.5 hours respectively |
| Preparation Example XII | Ni(1 wt. %)/Cd[Cr(0.05)]S | 143 | respectively |
| Preparation Example XIII | Ni(1 wt. %)/Cd[Cr(0.1)]S | 147 | |
| Preparation Example XIV | Ni(1 wt. %)/Cd[Cr(0.5)]S | 205 | |
| Preparation Example XV | Ni(1 wt. %)/Cd[Cr(1.0)]S | 185 | |
| Comparative Example I | Ni(3 wt. %)/Cd[Cr(0.2)]S | 121 | |
| Preparation Example XVI | Ru(1 wt. %)/Cd[Cr(0.2)]S | 158 | |
| Preparation Example XVII | $Ru_2O$(3 wt. %)/Cd[Cr(0.2)]S | 220 | |
| Preparation Example XVIII | Fe(1 wt. %)/Cd[Cr(0.2)]S | 63 | |
| Comparative Example II | Fe(3 wt. %)/Cd[Cr(0.2)]S | 53 | |
| Preparation Example XIX | Co(1 wt. %)/Cd[Cr(0.2)]S | 105 | |
| Preparation Example XX | Pd(1 wt. %)/Cd[Cr(0.2)]S | 99 | |
| Preparation Example XXI | Pt(1 wt. %)/Cd[Cr(0.2)]S | 196 | |
| Preparation Example XXII | Pt(1 wt. %)/Cd[Cr(0.2)]S | 253 | UV doping |
| Preparation Example XXIII | Pt(1 wt. %)/Cd[Cr(5.0)]S | 213 | |
| Preparation Example XXIV | Pt(1 wt. %)/Cd[Cr(5.0)]S | 244 | UV doping |
| Preparation Example XXV | Ni(1 wt. %)/Cd[Cr(5.0)]S | 189 | |
| Preparation Example XXVI | Ni(1 wt. %)/Cd[Al(0.5)]S | 137 | |
| Preparation Example XXVII | Ni(1 wt. %)/Cd[As(0.5)]S | 134 | |
| Preparation Example XXVIII | Ni(1 wt. %)/Cd[As(2.0)]S | 152 | |
| Preparation Example XXIX | Ni(1 wt. %)/Cd[Mn(0.2)]S | 209 | |
| Preparation Example XXX | Ni(1 wt. %)/Cd[Mn(0.5)]S | 181 | |
| Preparation Example XXXI | Ni(1 wt. %)/Cd[Sb(0.5)]S | 139 | |
| Preparation Example XXXII | Ni(1 wt. %)/Cd[Sb(2.0)]S | 75 | |
| Preparation Example XXXIII | Ni(1 wt. %)/Cd[Sb(0.01)]S | 156 | |
| Preparation Example XXXIV | Ni(1 wt. %)/Cd[Sb(0.1)]S | 125 | |
| Preparation Example XXXV | Ni(1 wt. %)/Cd[Sb(0.5)]S | 117 | |
| Preparation Example XXXVI | Ni(1 wt. %)/Cd[V(0.5)]S | 141 | |
| Preparation Example XXXVII | Ni(1 wt. %)/Cd[Cr(0.2)]S | 260 | |

Industrial Applicability

As apparent from the data according to Table I, the photocatalysts in accordance with the present invention show various kinds of transition metal included as a promoter and new addition technique thereof, optimal sintering time to enhance the effectiveness of photocatalysts, new contrived reduction system with sulfite in much less cost, improvement of the limited activity of photocatalysts of prior art, more simple preparation having little affect environment and much longer lifetime.

Furthermore, the amount of produced hydrogen increases remarkably as the highest reaction condition and optimal ratio of reducing agents are introduced in this present invention.

What is claimed is:

1. A method for preparing a CdS photocatalyst, represented by the following general formula VI, comprising the steps of: dissolving Cd-containing and M-containing compounds in water in such an amount that the mol. % of M ranges from 0.001 to 20.00; adding $H_2S$ or $Na_2S$ as a reactant in the solution with stirring to precipitate Cd[M]S; washing the precipitate with water and vacuum-drying the precipitate in a nitrogen environment at a temperature of 105~150° C. for 1.5~3.0 hours; and doping a liquid m-containing compound to this precipitate in such amount that the % by weight of m ranges from 0.10 to 5.00, $$m(A)/Cd[M(B)]S \qquad \text{VI}$$

wherein m represents a doped metal element as an electron acceptor selected from the group consisting of Fe and an oxidized compound of Fe; A represents a percentage by weight of m, ranging from 0.10 to 5.00; M is a promoter selected from the group consisting of As, Sb, and Pb; and B represents mole % of M/(M+Cd), ranging from 0.001 to 20.00.

2. A method for preparing said photocatalyst in accordance with claim 1, wherein said M-containing compounds are selected from the group consisting of $As_2O_5$, $SbCl_3$, $Pb(NO_3)_2$, and $Pb(CH_3CO_2)_4$.

3. A method for preparing said photocatalyst in accordance with claim 1, wherein said m-containing compound includes $FeCl_3$.

4. A method for preparing said photocatalyst in accordance with claim 1, wherein said Cd-containing compounds include $CdCl_{21}$, $CdBr_2$, $CdI_2$, $Cd(CH_3CO_2)_2 \cdot xH_2O$, $CdSO_4 \cdot xH_2O$ or $Cd(NO_3)_2 \cdot 4H_2O$.

5. A method for preparing said photocatalyst in accordance with claim 1, in which hydrochloric acid and ultrasonication treatments are performed before said vaccuum-drying step.

6. A method for producing hydrogen by using the photocatalyst as defined in claim 1, which comprises irradiating with visible light adjusted by a light filter or with sun light, an aqueous suspension of said photocatalyst, while stirring, which said aqueous suspension comprises from 0.05 to 1.00 mol/l of $Na_2SO_3$ as a reducing agent and from 0.05 to 1.00 mol/l of $Na_2S$ as an electron donor.

7. A method for producing hydrogen in accordance with claim 6, which comprises producing hydrogen at a temperature of from 10 to 60° C. in equal or less than 2 atm.

* * * * *